(12) United States Patent
Ganger et al.

(10) Patent No.: US 8,363,703 B2
(45) Date of Patent: Jan. 29, 2013

(54) SYSTEM AND METHOD FOR PHASE DETECTION

(75) Inventors: Jeffrey D. Ganger, Chandler, AZ (US); Claudio G. Rey, Tempe, AZ (US)

(73) Assignee: Fujitsu Semiconductor Limited, Yokohama-shi (JP)

( * ) Notice: Subject to any disclaimer, the term of this patent is extended or adjusted under 35 U.S.C. 154(b) by 293 days.

(21) Appl. No.: 12/895,203

(22) Filed: Sep. 30, 2010

(65) Prior Publication Data

US 2012/0082247 A1    Apr. 5, 2012

(51) Int. Cl.
*H03K 11/00* (2006.01)

(52) U.S. Cl. .................. 375/215; 178/20.04; 324/76.53; 327/147; 327/156; 342/103; 342/442; 375/294; 375/327; 375/375

(58) Field of Classification Search ................. None
See application file for complete search history.

(56) References Cited

U.S. PATENT DOCUMENTS

| | | | |
|---|---|---|---|
| 4,868,512 A | 9/1989 | Bridgman | 328/133 |
| 4,937,536 A | 6/1990 | Reinhardt et al. | 331/8 |
| 4,975,650 A | 12/1990 | Martin | 328/133 |
| 5,027,373 A | 6/1991 | Cok | 375/80 |
| 5,157,290 A | 10/1992 | Crosby | 307/511 |
| 6,194,917 B1 | 2/2001 | Deng | 327/12 |
| 6,377,081 B1 | 4/2002 | Tateyama | 327/12 |
| 6,466,067 B2 | 10/2002 | Matsui | 327/156 |
| 6,642,771 B1 | 11/2003 | Smetana | 327/411 |
| 7,595,698 B2 | 9/2009 | Ben-Bassat | 331/17 |
| 7,616,069 B2 | 11/2009 | Li | 331/25 |
| 2002/0127988 A1 | 9/2002 | Humes et al. | 455/260 |
| 2005/0134310 A1 | 6/2005 | Yin | 326/52 |
| 2006/0017471 A1 | 1/2006 | Nguyen | 327/3 |

*Primary Examiner* — David C. Payne
*Assistant Examiner* — Adolf Dsouza
(74) *Attorney, Agent, or Firm* — Baker Botts L.L.P.

(57) ABSTRACT

A method may include performing a logical exclusive OR and a logical inverse exclusive or on an input reference signal and an output signal to generate an XOR signal and an XNOR signal, respectively. The method may also include generating a switch control signal indicative of whether a first phase of the input reference signal leads or lags a second phase of the output signal. The method may additionally include: (i) transmitting the XOR signal to an output of a switch if the first phase leads the second phase; and (ii) transmitting the XNOR signal to the output of the switch if the first phase lags the second phase. The method may further include generating a phase detector output signal indicative of a phase difference between the second phase based on a signal present on the output of the switch.

10 Claims, 4 Drawing Sheets

SYSTEM AND METHOD FOR PHASE DETECTION

TECHNICAL FIELD

The present disclosure relates generally to phase detection in oscillators, including, without limitation, oscillators used in wireless communication devices.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. A receiver is an electronic device which receives and processes a wireless electromagnetic signal. A transmitter and receiver may be combined into a single device called a transceiver.

Transmitters, receivers, and transceivers often include components known as oscillators. An oscillator may serve many functions in a transmitter, receiver, and/or transceiver, including generating a local oscillator signal (usually in a radio-frequency range) for upconverting baseband signals onto a radio-frequency (RF) carrier and performing modulation for transmission of signals, and/or for downconverting RF signals to baseband signals and performing demodulation of received signals. Such oscillators may include components known as phase-locked loops (PLLs). A PLL may be a control system configured to generate an output signal whose phase is related to the phase of the input "reference" signal. A phase-locked loop circuit may compare the phase of the input signal with a phase signal derived from its output oscillator signal and adjusts the frequency of its oscillator to keep the phases matched.

In order to compare the phase of the input reference signal with an output oscillator signal, a PLL may include a component known as a phase detector. A phase detector as used in a PLL may be an electronic device that generates a signal (typically a voltage signal) which represents the difference in phase between the input reference signal and the output signal. For a Type I PLL, its phase detector is often implemented as a logical exclusive OR (XOR) gate, with the input reference signal and the output signal as inputs to the XOR gate. Accordingly, the output of the XOR gate phase detector may have an output of "high" or logic 1 when the input reference signal and output oscillator signal have different values, and may have an output of "low" of logic 0 when the input reference signal and output oscillator signal have the same values.

One shortcoming of the traditional XOR gate phase detector is the small lock range of PLLs utilizing XOR gate phase detectors. A lock range is the range of phase differences between the input reference signal and output oscillator signal for which the PLL can match or "lock" the phases of input reference signal and output oscillator signal. In addition, the output of the XOR gate phase detector may have a positive or negative slope, as shown in FIG. 6. Such negative or positive slope may cause positive feedback in a PLL depending on the sign of the PLL loop, thus potentially leading to instability. For instance, the PLL may have a metastable point which may lead to excessive peaking in the lock time of the PLL if the initial phase between the input reference signal and output oscillator signal at startup of the PLL is at this metastable point.

Various approaches have been used to address these shortcomings, including replacing the XOR gate phase detector with a Type II phase detector (also known as a charge pump-based phase detector), and/or increasing PLL bandwidth. However, such approaches may be undesirable. For example, increasing PLL bandwidth may increase the number of required reference spurs, and a charge pump-based detector may introduce undesirable noise. A time-to-digital converter may also be used as a phase detector to overcome the shortcomings of an XOR gate phase detector, but would likely generate more noise and consume more power, as well as requiring greater design complexity and circuit area.

SUMMARY

In accordance with some embodiments of the present disclosure, a method may include performing a logical exclusive OR and a logical inverse exclusive OR on an input reference signal and an output signal to generate an XOR signal and an XNOR signal, respectively. The method may also include generating a switch control signal indicative of whether a first phase of the input reference signal leads or lags a second phase of the output signal. The method may additionally include, based on the switch control signal: (i) transmitting the XOR signal to an output of a switch if the first phase leads the second phase; and (ii) transmitting the XNOR signal to the output of the switch if the first phase lags the second phase. The method may further include generating a phase detector output signal indicative of a phase difference between the second phase and the first phase based on a signal present on the output of the switch.

Technical advantages of one or more embodiments of the present disclosure may include a phase detector configured to reduce or eliminate the occurrence of positive feedback in a phase-locked loop, thus potentially reducing or eliminating instabilities or metastabilities in PLL circuits.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
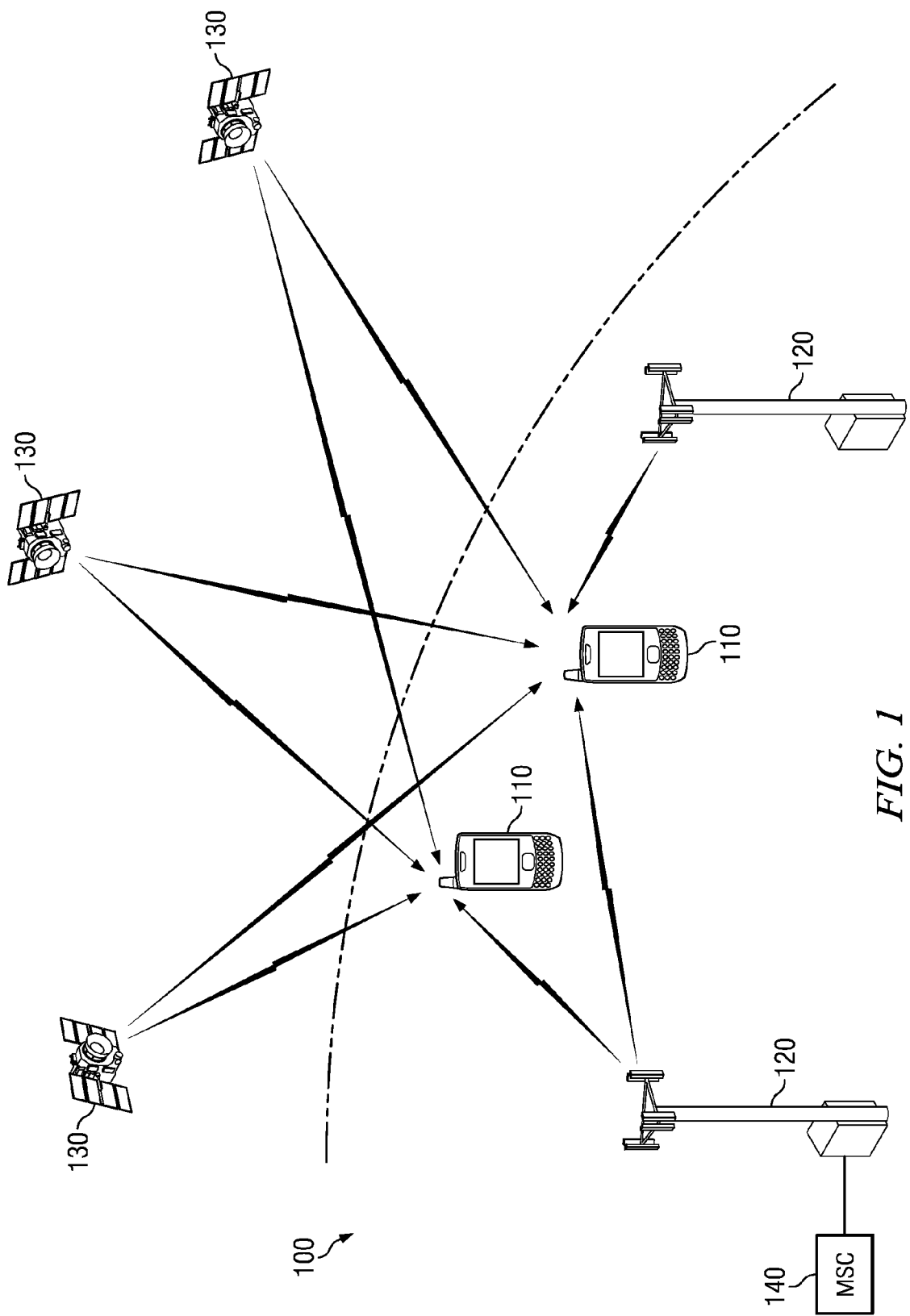
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology. A mobile switching center (MSC) 140 may be coupled to the base stations 120 and may provide coordination and control for base stations 120.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

Figure 2:
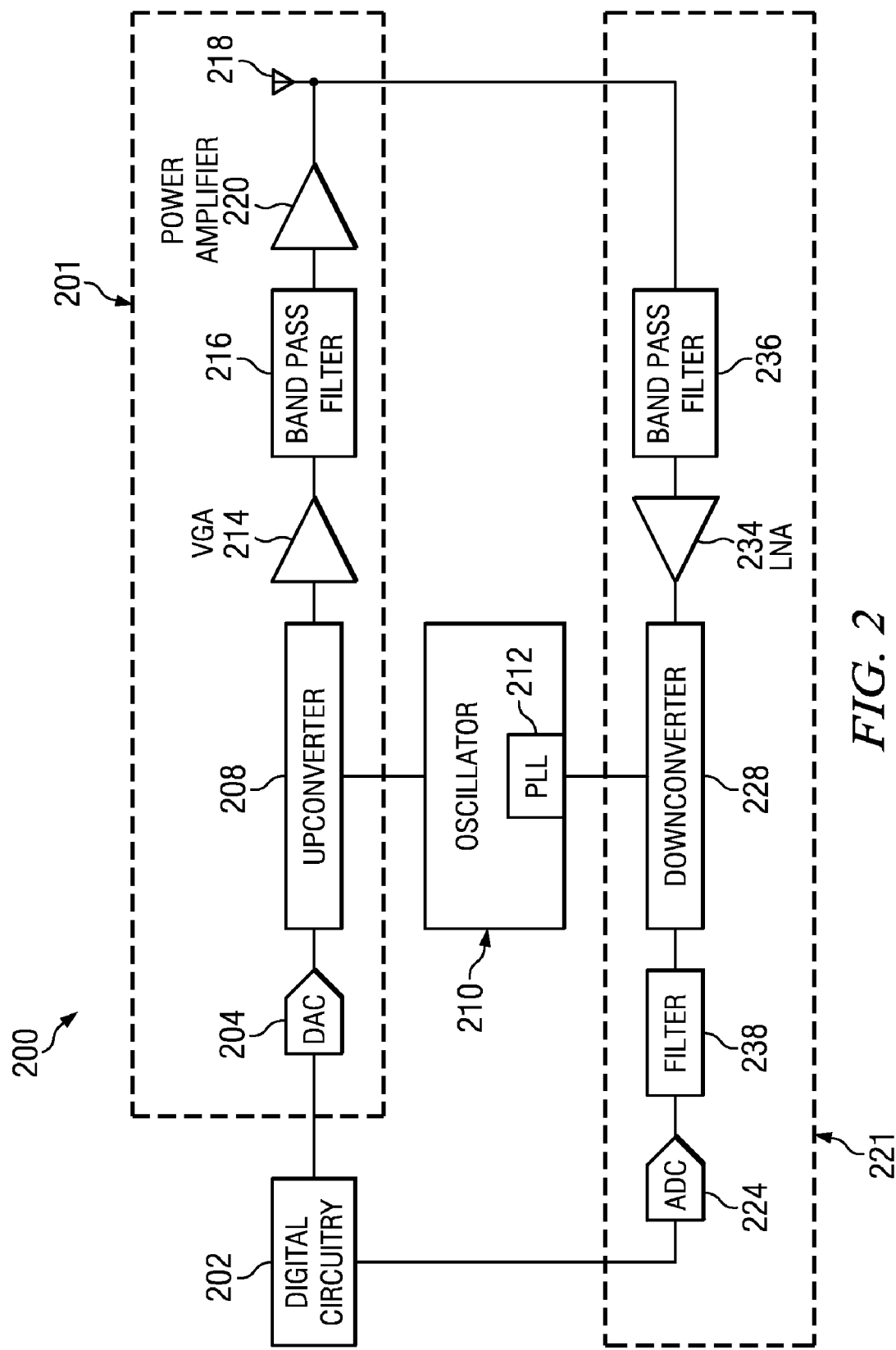
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201 and/or a receive path 221. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices.

Transmit path 201 may include a digital-to-analog converter (DAC) 204. DAC 204 may be configured to receive a digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

As shown in FIG. 2, oscillator may include a phase-locked loop (PLL) 212. PLL 212 may be a control system configured to generate a signal that has a fixed relation to the phase of a "reference" input signal by responding to both the frequency and the phase of the input signal, and automatically raising or lowering the frequency of a controlled oscillator until it is matched to the reference in both frequency and phase. PLL 212 may be described in greater detail below with reference to FIG. 3.

Transmit path 201 may include a variable-gain amplifier (VGA) 214 to amplify an upconverted signal for transmission, and a bandpass filter 216 configured to receive an amplified signal VGA 214 and pass signal components in the band of interest and remove out-of-band noise and undesired signals. The bandpass filtered signal may be received by power amplifier 220 where it is amplified for transmission via antenna 218. Antenna 218 may receive the amplified and transmit such signal (e.g., to one or more of a terminal 110, a base station 120, and/or a satellite 130).

Receive path 221 may include a bandpass filter 236 configured to receive a wireless communication signal (e.g., from a terminal 110, a base station 120, and/or a satellite 130) via antenna 218. Bandpass filter 236 may pass signal components in the band of interest and remove out-of-band noise and undesired signals. In addition, receive path 221 may include a low-noise amplifier (LNA) 224 to amplify a signal received from bandpass filter 236.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Figure 3:
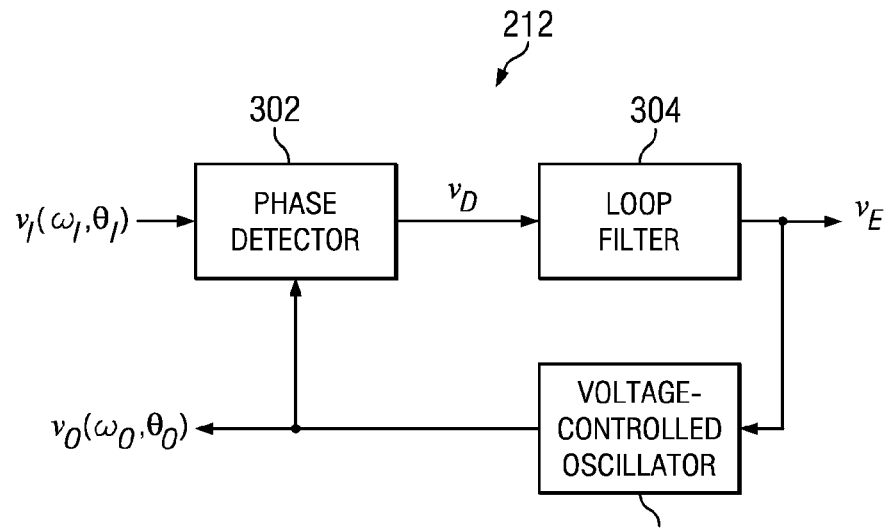
FIG. 3 illustrates a block diagram of a phase locked loop (PLL), in accordance with certain embodiments of the present disclosure.

FIG. 3 illustrates a block diagram of PLL 212, in accordance with certain embodiments of the present disclosure. PLL 212 may be a frequency-selective circuit designed to synchronize an incoming signal, $v_i(\omega_i, \theta_i)$ and maintain synchronization in spite of noise or variations in the incoming signal frequency. As depicted in FIG. 3, PLL 212 may comprise a phase detector 302, a loop filter 304, and a voltage-controlled oscillator (VCO) 306.

Phase detector 302 may be configured to compare the phase $\theta_I$ of the incoming reference signal $v_I$ to the phase $\theta_O$ of the VCO 306 output $v_O$, and produce a voltage $v_D$ proportional to the difference $\theta_I - \theta_O$. Phase detector 302 may be described in greater detail below with reference to FIG. 4. Voltage $v_D$ may be filtered by loop filter 304 to suppress high-frequency ripple and noise, and the result, called the error voltage $v_E$, may be applied to a control input of VCO 306 to adjust its frequency $\omega_{vco}$. VCO 306 may be configured such that with $v_E=0$ is it oscillating at some initial frequency $\omega_0$, known as the free-running frequency, so that the characteristic of VCO 306 is:

$$\omega_{vco} = \omega_0 + K_v v_E(t).$$

where $K_v$ is the gain of VCO 306, in radians-per-second per volt. If a periodic input is applied to PLL 212 with frequency $\omega_I$ sufficiently close to the free-running frequency $\omega_0$, an error voltage $v_E$ will develop, which will adjust $\omega_{vco}$ until $v_O$ becomes synchronized, or locked, with $v_I$. Should $\omega_I$ change, the phase shift between $v_O$ and $V_I$ will start to increase, changing $V_D$ and $v_E$. VCO 306 may be configured such that this change in $v_E$ adjusts $\omega_{vco}$ until it is brought back the same value as $\omega_I$, allowing the PLL 212, once locked, to track input frequency changes.

Figure 4:
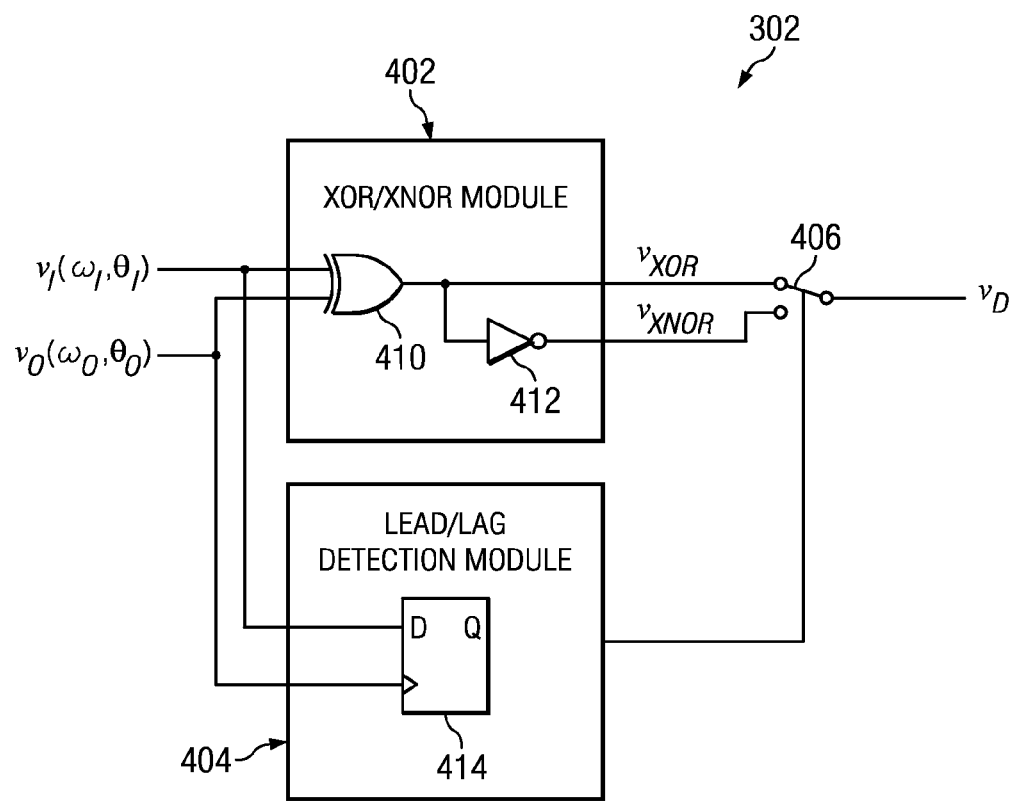
FIG. 4 illustrates a block diagram of a phase detector, in accordance with certain embodiments of the present disclosure.

FIG. 4 illustrates a block diagram of phase detector 302, in accordance with certain embodiments of the present disclosure. As shown in FIG. 4, phase detector 302 may include a XOR/XNOR module 402, a lead/lag detection module 404, and a switch 406.

XOR/XNOR module 402 may be any system, device or apparatus configured to output the logical exclusive OR (XOR) of the input reference signal $v_I$ and the VCO 306 output $v_O$, such output depicted as $v_{XOR}$ in FIG. 4. $v_{XOR}$ may be "high" or logic 1 when one, but not both, of the input reference signal $v_I$ and the VCO 306 output $v_O$ are high, and may be "low" or logic 0 when both of the input reference signal $v_I$ and the VCO 306 output $v_O$ are either high or low. In addition, XOR/XNOR module 402 may be configured to output the inverse of the logical XOR (XNOR) of the input reference signal $v_I$ and the VCO 306 output $v_O$, such output depicted as $v_{XNOR}$ in FIG. 4. $v_{XNOR}$ may be "high" or logic 1 when both of the input reference signal $v_I$ and the VCO 306 output $v_O$ are either high or low, and may be "low" or logic 0 when one, but not both, of the input reference signal $v_I$ and the VCO 306 output $v_O$ are high.

As shown in FIG. 4, XOR/XNOR module 402 may include an XOR gate 410 and an inverter 412. XOR gate 410 may be any system, device, or apparatus configured to perform a logical XOR on of the input reference signal $v_I$ and the VCO 306 output $v_O$, outputting the result as $v_{XOR}$. Inverter 412 may include any system, device or apparatus configured to invert a digital signal driven on its input. For example, if inverter 412 receives a low voltage (e.g., logic 0) driven on its input, it may drive a high voltage (e.g., logic 1) on its output. Alternatively, if inverter 412 receives a high voltage (e.g., logic 1) driven on its input, it may drive a low voltage (e.g., logic 0) on its output. In the embodiment depicted in FIG. 4, inverter 412 may invert the signal $v_{XOR}$, producing the signal $v_{XNOR}$ at its output. Although a particular implementation of XOR/XNOR module 402 is shown in FIG. 4, XOR/XNOR module 402 may be implemented in any suitable manner.

Lead/lag detection module 404 may include any system, device, or apparatus configured to detect whether the input reference signal $v_I$ leads the VCO 306 output $v_O$ (e.g., $\theta_I - \theta_O \leq \pi$ radians) or the input reference signal $v_I$ lags the VCO 306 output $v_O$ (e.g., $\theta_O - \theta_I \leq \pi$ radians), and output a signal indicative of such determination. For example, if $v_I$ leads $v_O$, lead/lag detection module 404 may output a "low" voltage or logic 0, and if $v_O$ leads $v_I$, lead/lag detection module 404 may output a "high" voltage or logic 1. In the embodiment depicted in FIG. 4, lead/lag detection module 404 is depicted as a D flip-flop 414. D flip-flop 414 may be configured such that its output (Q) takes on the state of the input (D) at the moment of a positive edge of a clock signal on the clock input. In the embodiment shown in FIG. 4, the input reference signal $v_I$ may be coupled to the input (D) and the VCO 306 output $v_O$ may be coupled to the clock input. Accordingly, the output (Q) of D flip-flop 414 may take on a "low" voltage or logic 0 when $v_I$ leads $v_O$ and take on a "high" voltage or logic 1 when $v_O$ leads $v_I$. Although a particular implementation of lead/lag detection module 404 is shown in FIG. 4, lead/lag detection module 404 may be implemented in any suitable manner, including without limitation any suitable combination analog circuitry, one or more combinational gates, one or more latches, and/or one or more flip-flops.

Switch 406 may include any system, device, or apparatus configured to selectively transmit a signal present on one of its inputs to its output based on a switching control signal received by switch 406. For example, as shown in FIG. 4, based on the output of lead/lag detection module 404, switch 406 may select either of $v_{XOR}$ or $v_{XNOR}$ for transmission to its output. For example, if $v_I$ leads $v_O$, switch 406 may transmit $v_{XOR}$, and may transmit $v_{XNOR}$ to its output if $v_I$ lags $v_O$. Switch 406 may be implemented in any suitable manner, including without limitation a switching circuit, one or more combinatorial gates, one or more p-type MOSFETS, one or more n-type MOSFETS, and/or one or more transmission gates.

Figure 5:
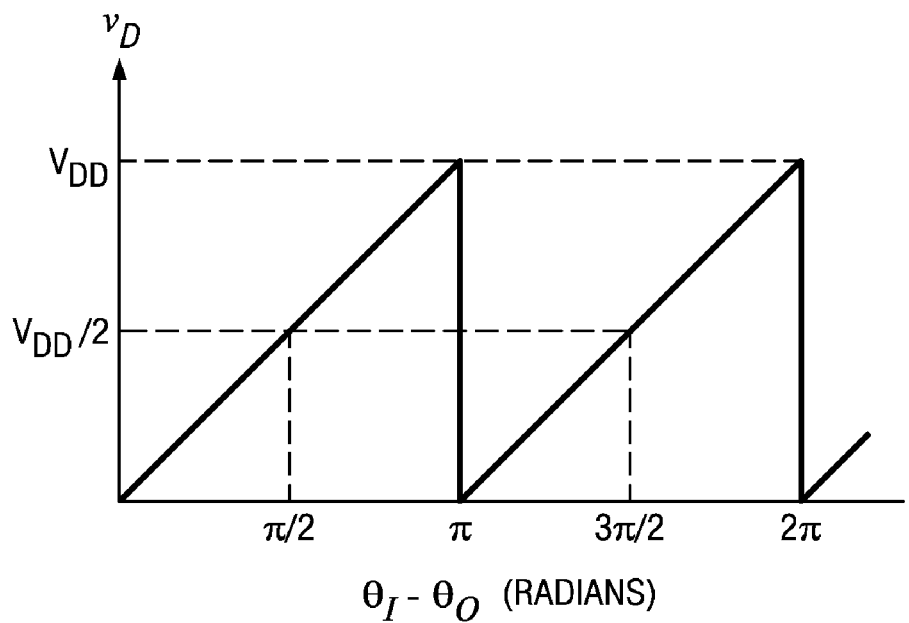
FIG. 5 illustrates an example graph of phase detector output voltage versus phase difference for the phase detector depicted in FIG. 4, in accordance with certain embodiments of the present disclosure.
Figure 6:
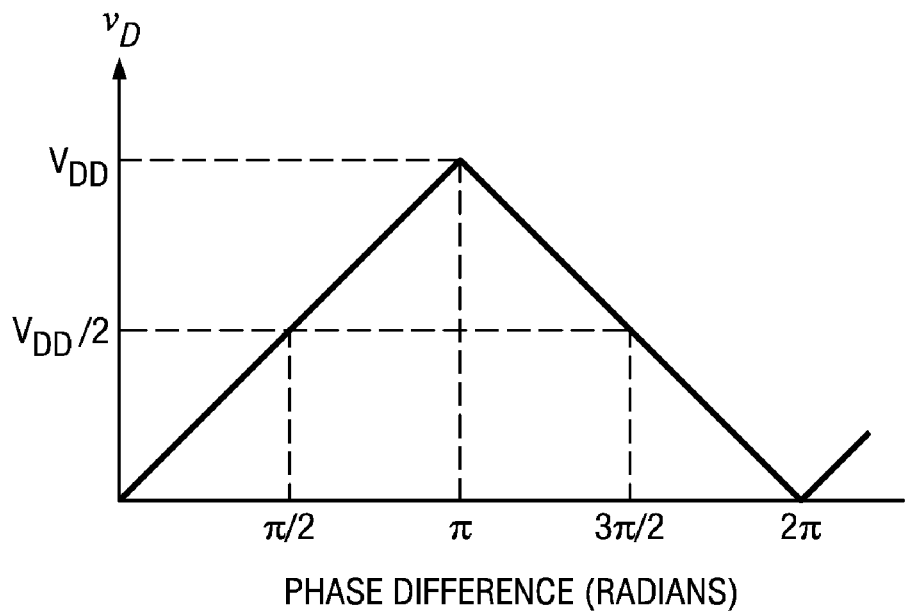
FIG. 6 illustrates an example graph of phase detector output voltage versus phase difference for a traditional XOR phase detector.

FIG. 5 illustrates an example graph of phase detector 302 output voltage $v_D$ versus phase difference $\theta_I - \theta_O$. It is noted that the waveform of FIG. 5 includes only one slope as compared to the waveform of FIG. 6 (depicting a standard XOR transfer function) which has both positive and negative slopes. PLL 212 and/or phase detector 302 may be configured to utilize a slope (either positive or negative) which allows PLL 212 to remain stable for all phase angles. Thus, while a positive slope is depicted in the waveform of FIG. 5, certain embodiments of phase detection 302 may generate a waveform having negative slope. Accordingly, PLLs utilizing phase detector 302 may not experience the positive feedback, instability, and/or metastability problems associated with PLLs utilizing traditional XOR phase detectors.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:
1. A wireless communication element, comprising:
   at least one of:
      a receive path configured to receive a first wireless communication signal and convert the first wireless communication signal into a first digital signal based at least on an oscillator signal; and a transmit path configured to convert a second digital signal into a second wireless communication signal based at least on the oscillator signal and transmit the second wireless communication signal; and an oscillator configured to output the oscillator signal to at least one of the receive path and the transmit path, the oscillator comprising a phase-locked loop configured to synchronize an output signal at its output to an input reference signal received at its input, the phase-locked loop comprising:

a phase detector configured to compare a first phase of the input reference signal to a second phase of the output signal and generate a phase detector output signal indicative of an a phase difference between the second phase and the first phase, the phase detector comprising:

an XOR/XNOR module configured to:
perform a logical exclusive OR on the input reference signal and the output signal to generate an XOR signal; and
perform a logical inverse exclusive OR on the input reference signal and the output signal to generate an XNOR signal;

a lead/lag detection module configured to detect whether the first phase leads or lags the second phase and generate a switch control signal indicative of such detection; and a switch configured to, based on the switch control signal:
transmit the XOR signal as the phase detector output signal if the first phase leads the second phase; and
transmit the XNOR signal as the phase detector output signal if the first phase lags the second phase;

a loop filter coupled to the phase detector and configured to filter the phase detector output signal to generate an error signal; and a voltage controlled oscillator configured to generate the output signal based on the error signal.

2. A wireless communication element in accordance with claim 1, the XOR/XNOR module comprising:
an exclusive OR gate configured to perform the logical exclusive OR on the input reference signal and the output signal to generate the XOR signal; and
an inverter configured to perform a logical inversion of the XOR signal to generate the XNOR signal.

3. A wireless communication element in accordance with claim 1, the lead/lag detection module comprising a D flip-flop, the D flip-flop configured such that:
one of the input reference signal and the output signal is coupled to a data input of the D flip-flop;
the other of the input reference signal and the output signal is coupled to a clock input of the D flip-flop; and
the switch control signal is generated based on signals on the data input and the clock input.

4. A phase-locked loop configured to synchronize an output signal at its output to an input reference signal received at its input, the phase-locked loop comprising:
a phase detector configured to compare a first phase of the input reference signal to a second phase of the output signal and generate a phase detector output signal indicative of a phase difference between the second phase and the first phase, the phase detector comprising:
an XOR/XNOR module configured to:
perform a logical exclusive OR on the input reference signal and the output signal to generate an XOR signal; and
perform a logical inverse exclusive OR on the input reference signal and the output signal to generate an XNOR signal;

a lead/lag detection module configured to detect whether the first phase leads or lags the second phase and generate a switch control signal indicative of such detection; and a switch configured to, based on the switch control signal:
transmit the XOR signal as the phase detector output signal if the first phase leads the second phase; and
transmit the XNOR signal as the phase detector output signal if the first phase lags the second phase;

a loop filter coupled to the phase detector and configured to filter the phase detector output signal to generate an error signal; and a voltage controlled oscillator configured to generate the output signal based on the error signal.

5. A phase-locked loop in accordance with claim 4, the XOR/XNOR module comprising:
an exclusive OR gate configured to perform the logical exclusive OR on the input reference signal and the output signal to generate the XOR signal; and
an inverter configured to perform a logical inversion of the XOR signal to generate the XNOR signal.

6. A phase-locked loop in accordance with claim 4, the lead/lag detection module comprising a D flip-flop, the D flip-flop configured such that:
one of the input reference signal and the output signal is coupled to a data input of the D flip-flop;
the other of the input reference signal and the output signal is coupled to a clock input of the D flip-flop; and
the switch control signal is generated based on signals on the data input and the clock input.

7. A phase detector configured to compare a first phase of an input reference signal to a second phase of an output signal and generate a phase detector output signal indicative of a phase difference between the second phase and the first phase, the phase detector comprising:
an XOR/XNOR module configured to:
perform a logical exclusive OR on the input reference signal and the output signal to generate an XOR signal; and
perform a logical inverse exclusive OR on the input reference signal and the output signal to generate an XNOR signal;

a lead/lag detection module configured to detect whether the first phase leads or lags the second phase and generate a switch control signal indicative of such detection; and a switch configured to, based on the switch control signal:
transmit the XOR signal as the phase detector output signal if the first phase leads the second phase; and
transmit the XNOR signal as the phase detector output signal if the first phase lags the second phase.

8. A phase detector in accordance with claim 7, the XOR/XNOR module comprising:
an exclusive OR gate configured to perform the logical exclusive OR on the input reference signal and the output signal to generate the XOR signal; and
an inverter configured to perform a logical inversion of the XOR signal to generate the XNOR signal.

9. A phase detector in accordance with claim 7, the lead/lag detection module comprising a flip-flop, the flip-flop configured such that:
- one of the input reference signal and the output signal is coupled to a data input of the flip-flop;
- the other of the input reference signal and the output signal is coupled to a clock input of the flip-flop; and
- the switch control signal is generated based on signals on the data input and the clock input.

10. A method comprising:
- performing a logical exclusive OR on an input reference signal and an output signal to generate an XOR signal;
- performing a logical inverse exclusive OR on the input reference signal and the output signal to generate an XNOR signal;
- generating a switch control signal indicative of whether a first phase of the input reference signal leads or lags a second phase of the output signal;
- based on the switch control signal:
  - transmitting the XOR signal to an output of a switch if the first phase leads the second phase; and
  - transmitting the XNOR signal to the output of the switch if the first phase lags the second phase; and
- generating a phase detector output signal indicative of a phase difference between the second phase and the first phase based on a signal present on the output of the switch.

* * * * *